US 9,056,992 B2

(12) United States Patent
Sao et al.

(10) Patent No.: US 9,056,992 B2
(45) Date of Patent: *Jun. 16, 2015

(54) NONAQUEOUS INK COMPOSITION FOR INK JET RECORDING AND INK JET RECORDING METHOD

(75) Inventors: Akihito Sao, Matsumoto (JP); Shinichi Itaya, Matsumoto (JP); Shushi Makita, Matsumoto (JP)

(73) Assignee: Seiko Epson Corporation, Suwa-shi (JP)

( * ) Notice: Subject to any disclaimer, the term of this patent is extended or adjusted under 35 U.S.C. 154(b) by 281 days.

This patent is subject to a terminal disclaimer.

(21) Appl. No.: 13/116,570

(22) Filed: May 26, 2011

(65) Prior Publication Data

US 2011/0292141 A1    Dec. 1, 2011

(30) Foreign Application Priority Data

May 26, 2010    (JP) ................. 2010-120139

(51) Int. Cl.
| | |
|---|---|
| *B41J 2/01* | (2006.01) |
| *C09D 11/322* | (2014.01) |
| *B41J 2/21* | (2006.01) |
| *C09D 11/36* | (2014.01) |
| *C09D 11/324* | (2014.01) |

(52) U.S. Cl.
CPC ............. *C09D 11/322* (2013.01); *B41J 2/2107* (2013.01); *C09D 11/324* (2013.01); *C09D 11/36* (2013.01)

(58) Field of Classification Search
CPC ............ B41J 2/01; B41J 2/2107; B41J 3/407; C09D 11/30; C09D 11/322; C09D 11/36; C09D 11/326
USPC .................. 347/95–100, 21, 28; 523/160, 161; 106/31.13, 31.6
See application file for complete search history.

(56) References Cited

U.S. PATENT DOCUMENTS

| | | | | |
|---|---|---|---|---|
| 3,914,303 | A * | 10/1975 | Daniher et al. ............. | 564/136 |
| 4,270,917 | A | 6/1981 | Heald et al. | |
| 6,362,348 | B1 * | 3/2002 | Takahashi et al. ........... | 549/315 |
| 7,156,909 | B2 | 1/2007 | Oyanagi et al. | |
| 7,172,648 | B2 * | 2/2007 | Ichikawa ................... | 106/31.58 |
| 7,414,082 | B2 | 8/2008 | Hirasa et al. | |
| 7,488,763 | B2 | 2/2009 | Ushiku et al. | |
| 7,897,657 | B2 | 3/2011 | Nakano et al. | |
| 8,338,645 | B2 * | 12/2012 | Shiraki et al. ................. | 564/136 |
| 8,440,745 | B2 | 5/2013 | Kotera et al. | |
| 8,557,032 | B2 | 10/2013 | Sugita et al. | |
| 2002/0019458 | A1 | 2/2002 | Hirasa et al. | |
| 2004/0119801 | A1 | 6/2004 | Suzuki et al. | |
| 2006/0092249 | A1 | 5/2006 | Chung et al. | |
| 2007/0107146 | A1 | 5/2007 | Egli | |
| 2008/0097013 | A1 | 4/2008 | Mizutani | |
| 2009/0047484 | A1 * | 2/2009 | Kitamura et al. .......... | 428/195.1 |
| 2009/0295847 | A1 | 12/2009 | Mukai et al. | |
| 2010/0076223 | A1 * | 3/2010 | Shiraki et al. ................ | 564/136 |
| 2011/0263898 | A1 | 10/2011 | Guglieri et al. | |
| 2011/0292114 | A1 * | 12/2011 | Sao et al. ....................... | 347/20 |
| 2012/0056929 | A1 * | 3/2012 | Sao et al. ....................... | 347/20 |
| 2012/0249666 | A1 * | 10/2012 | Maki et al. .................... | 347/20 |

FOREIGN PATENT DOCUMENTS

| | | |
|---|---|---|
| EP | 1867690 A1 | 12/2007 |
| EP | 1892271 A1 | 2/2008 |
| EP | 2123631 A1 | 11/2009 |
| GB | 2035384 A | 6/1980 |
| JP | 48-014888 A | 2/1973 |
| JP | 50094058 A | 7/1975 |
| JP | 50-100386 A | 8/1975 |
| JP | S54-2484 A | 1/1979 |
| JP | S55-54353 A | 4/1980 |
| JP | 61-213273 A | 9/1986 |
| JP | H08-127981 A | 5/1996 |
| JP | H10-158556 A | 6/1998 |
| JP | 11-335608 A | 12/1999 |
| JP | 2002-167536 A | 6/2002 |
| JP | 2003-201428 A | 7/2003 |
| JP | 2004-197046 A | 7/2004 |
| JP | 2004-250353 A | 9/2004 |
| JP | 2004-292468 A | 10/2004 |
| JP | 2005-015672 A | 1/2005 |
| JP | 2005-047885 A | 2/2005 |
| JP | 2006-124855 A | 5/2006 |
| JP | 2007-146002 A | 6/2007 |
| JP | 2007-177160 A | 7/2007 |

(Continued)

OTHER PUBLICATIONS

Database CA [Online] Chemical Abstracts Service, Columbus, OH, Hazama, Database Accession No. 2010:1035182.

(Continued)

*Primary Examiner* — Matthew Luu
*Assistant Examiner* — Rut Patel
(74) *Attorney, Agent, or Firm* — Nutter McClennen & Fish LLP; John J. Penny, Jr.

(57) ABSTRACT

A nonaqueous ink composition for ink jet recording includes a solvent represented by general formula (1) and having a hydrophile-lipophile balance value of 10.5 to 20.0:

(1)

$$R^1\text{-O-CH}_2\text{-CH}_2\text{-C(=O)-N(CH}_3\text{)-}$$

where $R^1$ denotes an alkyl group having 1 to 4 carbon atoms.

6 Claims, No Drawings

(56) References Cited

FOREIGN PATENT DOCUMENTS

| | | |
|---|---|---|
| JP | 2007-256485 A | 10/2007 |
| JP | 2007-291257 A | 11/2007 |
| JP | 2008-013714 A | 1/2008 |
| JP | 2008-163238 A | 7/2008 |
| JP | 2008-238031 A | 10/2008 |
| JP | 2008-260944 A | 10/2008 |
| JP | 2008-274034 A | 11/2008 |
| JP | 2009-74034 A | 4/2009 |
| JP | 2009-191221 A | 8/2009 |
| JP | 2009-227813 A | 10/2009 |
| JP | 2009-242649 A | 10/2009 |
| JP | 2010-180332 A | 8/2010 |
| JP | 2012-046671 A | 3/2012 |
| WO | 02-055619 A | 7/2002 |
| WO | 2004/035690 A1 | 4/2004 |
| WO | 2006/075373 A1 | 7/2006 |
| WO | 2009/133181 A1 | 11/2009 |

OTHER PUBLICATIONS

Database CA [Online] Chemical Abstracts Service, Columbus, OH, Yoshio, Database accession No. 2007:1096682.

Database WPI, Week 197716, Thomson Scientific, AN 1977-27746Y.

Database WPI, Week 201059, Thompson Scientific, AN 2010-K58621.

EP Search Report.

Extended European Search Report issued Sep. 30, 2011 in connection with European Application No. 11167243.2.

Soeda, et al., "Development of ink by solubilization of disperse dye", Bulletin of Tokyo Metropolitan; Industrial Technology Research Institute, 2006, No. 1, pp. 74-75.

* cited by examiner

NONAQUEOUS INK COMPOSITION FOR INK JET RECORDING AND INK JET RECORDING METHOD

Priority is claimed under 35 U.S.C. §119 to Japanese Application No. 2010-120139 filed on May 26, 2010, which is hereby incorporated by reference in its entirety.

BACKGROUND

1. Technical Field

The present invention relates to a nonaqueous ink composition for ink jet recording and an ink jet recording method using the nonaqueous ink composition.

2. Related Art

Ink jet printing is a technique for printing images and characters by using small ink droplets discharged from nozzles of an ink jet recording head. Ink jet printing has mainly been used for printing images and characters on a surface of a water-absorbing recording medium such as paper. Aqueous inks produced by adding colorants such as water-soluble dyes to water are widely used as the inks for ink jet printing. However, recent years have seen use of ink jet printing in printing on surfaces of various other types of recording media in various different fields. In order to render the ink jet printing technique suitable for printing on various types of recording media, nonaqueous inks substantially free of water as a solvent have been developed to replace the aqueous inks.

Examples of such nonaqueous inks include those based on glymes (a.k.a. glycol diethers) such as diethylene glycol diethyl ether, glycol dialkyl ethers such as diethylene glycol butyl methyl ether, glycol monoalkyl ethers such as diethylene glycol monobutyl ether, dicarboxylic acid diesters such as dimethyl glutarate, lactones such as γ-butyrolactone, and amide-based solvents such as N-methyl-2-pyrrolidone (for example, refer to Japanese Unexamined Patent Application Publication No. 2009-74034). These nonaqueous inks are designed to firmly fix onto surfaces of vinyl chloride resins and form images and characters that have high water-resistance, lightfastness, and rub resistance.

These nonaqueous inks are formulated based on the assumption that printing is to be conducted on vinyl chloride resins. Thus, it has been necessary to limit the contents of protic polar media. This results in poor proton donor ability and a viscosity close to that of a Newtonian flow. In order to assure ink discharge stability during ink droplet formation (in particular, in the case where high frequency is used) with the ink jet recording method, it is necessary that the ink have a particular degree of pseudoplastic flow behavior. However, as for nonaqueous ink, there has been no adequate materials for imparting pseudoplasticity and it has been difficult to assure good discharge stability.

Moreover, the fixability of the nonaqueous ink onto recording media composed of vinyl chloride resin has not been sufficient and the recorded images sometimes fail to achieve sufficient rub resistance.

SUMMARY

An advantage of same aspects of the invention is to provide a nonaqueous ink composition for ink jet that has good discharge stability and/or high rubbing fastness for a recorded image and an ink jet recording method that uses the nonaqueous ink composition.

A first aspect of the invention provides a nonaqueous ink composition for ink jet recording, the nonaqueous ink composition including a solvent that is represented by general formula (1) and has a hydrophile-lipophile balance value of 10.5 to 20.0:

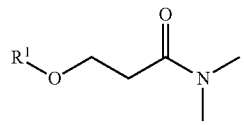

(1)

where $R^1$ denotes an alkyl group having 1 to 4 carbon atoms.

$R^1$ in the solvent represented by general formula (1) may be a methyl group or an n-butyl group.

The content of the solvent represented by general formula (1) is preferably 10 to 90% by mass and more preferably 30 to 90% by mass.

The nonaqueous ink composition may further include at least one selected from the group consisting of an alkylene glycol compound and a lactone that are liquid under normal temperature and pressure. The nonaqueous ink composition may further include a pigment.

The nonaqueous ink composition preferably has a viscosity of 2 mPa·s to 15 mPa·s at a measuring temperature of 20° C. The nonaqueous ink composition preferably has a surface tension of 20 mN/m to 50 mN/m at a measuring temperature of 20° C.

A second aspect of the invention provides an ink jet recording method that includes discharging droplets of the aforementioned nonaqueous ink composition of the first aspect, and allowing the droplets to adhere to a surface of a recording medium containing a vinyl chloride resin so as to record an image.

A third aspect of the invention provides an ink jet recording method that includes discharging droplets of the aforementioned nonaqueous ink composition of the first aspect with $R^1$ in general formula (1) denoting a methyl group or an n-butyl group, and allowing the droplets to adhere to a surface of a recording medium containing a vinyl chloride resin so as to record an image.

A fourth aspect of the invention provides an ink jet recording method that includes discharging droplets of the aforementioned nonaqueous ink composition of the first aspect, and allowing the droplets to adhere to a surface of a recording medium containing a vinyl chloride resin so as to record an image, wherein the solvent content in the nonaqueous ink composition is 10 to 90% by mass.

A fifth aspect of the invention provides an ink jet recording method that includes discharging droplets of the aforementioned nonaqueous ink composition of the first aspect, and allowing the droplets to adhere to a surface of a recording medium containing a vinyl chloride resin so as to record an image, wherein the solvent content in the nonaqueous ink composition is 30 to 90% by mass.

A sixth aspect of the invention provides an ink jet recording method that includes discharging droplets of the aforementioned nonaqueous ink composition of the first aspect, and allowing the droplets to adhere to a surface of a recording medium containing a vinyl chloride resin so as to record an image, wherein the nonaqueous ink composition further includes at least one selected from the group consisting of an alkylene glycol compound and a lactone that are liquid under normal temperature and pressure.

A seventh aspect of the invention provides an ink jet recording method that includes discharging droplets of the aforementioned nonaqueous ink composition of the first aspect, and allowing the droplets to adhere to a surface of a recording medium containing a vinyl chloride resin so as to record an image, wherein the nonaqueous ink composition further includes a pigment.

An eighth aspect of the invention provides an ink jet recording method that includes discharging droplets of the aforementioned nonaqueous ink composition of the first aspect, and allowing the droplets to adhere to a surface of a recording medium containing a vinyl chloride resin so as to record an image, wherein the nonaqueous ink composition has a viscosity of 2 mPa·s to 15 mPa·s at a measuring temperature of 20° C.

A ninth aspect of the invention provides an ink jet recording method that includes discharging droplets of the aforementioned nonaqueous ink composition of the first aspect, and allowing the droplets to adhere to a surface of a recording medium containing a vinyl chloride resin so as to record an image, wherein the nonaqueous ink composition has a surface tension of 20 mN/m to 50 mN/m at a measuring temperature of 20° C.

According to the ink jet recording methods of the second to ninth aspects of the invention, an ink jet head exhibits good discharge stability since the nonaqueous ink composition is used. Moreover, since the solvent represented by general formula (1) interacts with a vinyl chloride resin in a recording medium, images and characters can firmly adhere onto a surface of the recording medium.

DESCRIPTION OF EXEMPLARY EMBODIMENTS

Preferred embodiments of the invention will now be described in detail. The embodiments described below are merely illustrative and do not limit the scope of the invention. The invention also encompasses various other alterations and modification within the scope of the invention.

1. Nonaqueous Ink Composition for Ink Jet Recording

A nonaqueous ink composition for ink jet recording (also simply referred to as "nonaqueous ink composition") according to an embodiment at least contains a particular solvent for imparting pseudoplasticity. For the purposes of the invention, the "nonaqueous ink composition" refers to an ink composition prepared without intentionally adding water and may contain trace amounts of moisture that inevitably comes to be mixed during preparation and storage of the ink composition.

Components used in this embodiment will now be described in detail.

1.1. Solvent

The nonaqueous ink composition of this embodiment at least contains a solvent represented by general formula (1) below:

(1)

Extensive investigations have found that $R^1$ is preferably an alkyl group having 1 to 4 carbon atoms. The alkyl group having 1 to 4 carbon atoms can be a straight or branched alkyl group, e.g., a methyl group, an ethyl group, an n-propyl group, an iso-propyl group, an n-butyl group, an iso-butyl group, a sec-butyl group, or a tert-butyl group. A solvent represented by formula (1) that has $R^1$ denoting an alkyl group having 1 to 4 carbon atoms can impart suitable pseudoplasticity to the nonaqueous ink composition, and thus good ink discharge stability can be ensured. Moreover, a solvent represented by formula (1) that has $R^1$ denoting an alkyl group having 1 to 4 carbon atoms interacts with vinyl chloride resins and the ink can be firmly fixed onto the surface of a recording medium containing a vinyl chloride resin.

The hydrophile-lipophile balance (HLB) value of the solvent represented by formula (1) is 10.5 to 20.0 and preferably 12.0 to 18.5. When the HLB value of the solvent represented by formula (1) is in these ranges, suitable pseudoplasticity can be imparted to the ink and the interaction with the vinyl chloride resins can be enhanced. The HLB value in the specification is a value calculated from equation (2) below based on the ratio of an inorganic character (I) to an organic character (O) (this ratio is also referred to as "I/O value") in an organic conceptual diagram:

$$\text{HLB value} = (\text{inorganic character } (I)/\text{organic character } (O)) \times 10 \qquad (2)$$

In particular, the I/O value can be determined by referring to literatures such as Atsushi FUJITA, Systematic Organic Qualitative Analysis—Mixture [original Japanese title: Kei-toteki yuuki teisei bunseki—Kongoubutsu hen], published by Kazamashobo 1974; Nobuhiko KUROKI, Theoretic Chemistry of Dyeing [original Japanese title: Senshoku riron kagaku] published by Maki Shoten 1966; and Hiroo INOUE, Organic Compound Separation Technology [original Japanese title: Yuuki kagobutsu bunri ho] published by Shokabo Publishing Co., Ltd., 1990.

The content of the solvent represented by formula (1) in the nonaqueous ink composition of this embodiment is preferably 10 to 90% by mass and more preferably 30 to 90% by mass. When the content of the solvent represented by formula (1) is 10% by mass or more, a suitable degree of pseudoplasticity is imparted to the nonaqueous ink composition and the ink discharge stability can be ensured. When the content of the solvent represented by formula (1) is 30% by mass or more, the rub resistance of the recorded image can be further improved due to the interaction with the vinyl chloride resins.

1.2. Other Additives

The nonaqueous ink composition of this embodiment may contain an organic solvent other than the solvent represented by formula (1), a surfactant, a pigment, a dispersant, etc., according to need.

1.2.1. Other Organic Solvent

The nonaqueous ink composition of this embodiment preferably contains at least one selected from the group consisting of an alkylene glycol compound and a lactone that are liquid under normal temperature and pressure, and more preferably contains an alkylene glycol compound in order to firmly fix the ink onto a vinyl chloride resin.

The alkylene glycol compound is preferably an ethylene glycol compound or a propylene glycol compound described in International Publication No. 2002/055619 pamphlet.

Examples of the preferable ethylene glycol compound include monoethers and diethers of ethylene glycol, diethylene glycol, triethylene glycol, tetraethylene glycol, and polyethylene glycol. Among these, a diethylene glycol compound is particularly preferable. Examples of the preferable propylene glycol compound include monoethers and diethers of propylene glycol, dipropylene glycol, tripropylene glycol, and polypropylene glycol. Among these, a dipropylene glycol compound is particularly preferable.

A diethylene glycol compound represented by formula (3) below may be used as the diethylene glycol compound described above:

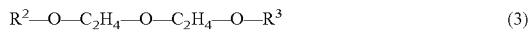

$$R^2-O-C_2H_4-O-C_2H_4-O-R^3 \quad (3)$$

In formula (3), $R^2$ and $R^3$ each independently denote a hydrogen atom, an alkyl group having 1 to 4 carbon atoms, or $R^4CO$ group where $R^4$ denotes an alkyl group having 1 to 4 carbon atoms. An alkyl group having 1 to 4 carbon atoms can be a straight or branched alkyl group, e.g., a methyl group, an ethyl group, an n-propyl group, an iso-propyl group, an n-butyl group, a sec-butyl group, or a tert-butyl group. Examples of the diethylene glycol compound represented by formula (3) include diethylene glycol, diethylene glycol monomethyl ether, diethylene glycol dimethyl ether, diethylene glycol methyl ethyl ether, diethylene glycol monoethyl ether, diethylene glycol diethyl ether, diethylene glycol mono-n-butyl ether, diethylene glycol di-n-butyl ether, diethylene glycol butyl methyl ether, diethylene glycol monoethyl ether acetate, and diethylene glycol mono-n-butyl ether acetate.

A dipropylene glycol compound represented by general formula (4) below can be used as the dipropylene glycol compound described above:

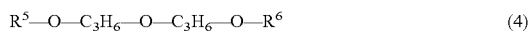

$$R^5-O-C_3H_6-O-C_3H_6-O-R^6 \quad (4)$$

In formula (4), $R^5$ and $R^6$ each independently denote a hydrogen atom, an alkyl group having 1 to 4 carbon atoms, or $R^7CO$ group where $R^7$ denotes an alkyl group having 1 to 4 carbon atoms. An alkyl group having 1 to 4 carbon atoms can be a straight or branched alkyl group, e.g., a methyl group, an ethyl group, an n-propyl group, an iso-propyl group, an n-butyl group, a sec-butyl group, or a tert-butyl group. Examples of the dipropylene glycol compound represented by formula (4) include dipropylene glycol, dipropylene glycol monomethyl ether, and dipropylene glycol monoethyl ether.

A lactone having 6 or less carbon atoms is preferred as the lactone. The lactone is more preferably β-propiolactone, β-butyrolactone, γ-butyrolactone, γ-valerolactone, or ε-caprolactone.

The ethylene glycol compound, dipropylene glycol compound, and lactone that can be used in the nonaqueous ink composition of this embodiment preferably have a boiling point of 150° C. or more and more preferably 180° C. or more under normal pressure.

The diethylene glycol compound and the dipropylene glycol compound that can be used in the nonaqueous ink composition of this embodiment preferably have a vapor pressure of 1 hPa or less and more preferably 0.7 hPa or less at 20° C.

When a diethylene glycol compound or dipropylene glycol compound that satisfies the aforementioned conditions of high boiling point and low vapor pressure is used, the load of providing local exhaust equipment or exhaust gas treating equipment can be reduced, the work environment can be improved, and the impact on the surrounding environment can be decreased.

The nonaqueous ink composition of this embodiment preferably contains the diethylene glycol compound. The diethylene glycol compound content can be adequately adjusted according to the printing properties but is preferably 20 to 80% by mass relative to the total mass of the nonaqueous ink composition.

The nonaqueous ink composition of this embodiment may contain a polyethylene glycol monoether compound represented by general formula (5) below, which is liquid under normal temperature and normal pressure, in addition to the diethylene glycol compound, the dipropylene glycol compound, the lactone, or a mixture thereof described above:

$$R^8-(OC_2H_4)_n-OR^9 \quad (5)$$

In formula (5), $R^8$ and $R^9$ each independently denote an alkyl group having 1 to 6 carbon atoms (preferably an alkyl group having 1 to 4 carbon atoms) and n denotes an integer of 3 to 6. An alkyl group having 1 to 6 carbon atoms can be a straight or branched alkyl group and examples thereof include examples of the alkyl group having 1 to 4 carbon atoms described above, a straight or branched pentyl group, and a straight or branched hexyl group.

The polyethylene glycol monoether compound that can be used in the nonaqueous ink composition of this embodiment preferably has a boiling point of 200° C. or more and preferably 250° C. or more under normal pressure, and a flash point of 100° C. or more and preferably 130° C. or more. When such a polyethylene glycol monoether compound is used, evaporation of the nonaqueous ink composition can be suppressed. For example, when evaporation of the nonaqueous ink composition is suppressed in a tube for transporting the nonaqueous ink composition from an ink cartridge to an ink jet recording head, accumulation of solid components in the tube can be prevented or reduced.

Examples of the preferable polyethylene glycol monoether compound include triethylene glycol monoether compounds (e.g., triethylene glycol monomethyl ether and triethylene glycol monobutyl ether) and a mixture of polyethylene glycol monoether compounds (in particular, polyethylene glycol monomethyl ethers) represented by general formula (5) with n being an integer of 4 to 6, e.g., a mixture of tetraethylene glycol monomethyl ether, pentaethylene glycol monomethyl ether, and hexaethylene glycol monomethyl ether.

The nonaqueous ink composition of this embodiment may further contain an organic solvent, examples of which are given below, in addition to the organic solvent described above.

The organic solvent is preferably a polar organic solvent. Examples of the polar organic solvent include alcohols (e.g., methyl alcohol, ethyl alcohol, propyl alcohol, butyl alcohol, and fluorinated alcohol), ketones (e.g., acetone, methyl ethyl ketone, and cyclohexanone), carboxylic acid esters (e.g., methyl acetate, ethyl acetate, propyl acetate, butyl acetate, methyl propionate, and ethyl propionate), and ethers (e.g., diethyl ether, dipropyl ether, tetrahydrofuran, and dioxane).

When the nonaqueous ink composition of this embodiment contains at least one of the diethylene glycol compound, the dipropylene glycol compound, and the lactone but not the polyethylene glycol monoether compound, the total amount of the diethylene glycol compound, the dipropylene glycol compound, and the lactone is preferably 75% by mass or more of the total amount of all organic solvent components.

When the nonaqueous ink composition of this embodiment contains the ethylene glycol compound, the dipropylene glycol compound, the lactone, and the polyethylene glycol monoether compound, the total amount of the diethylene glycol compound, the dipropylene glycol compound, the lactone, and the polyethylene glycol monoether is preferably 80% by mass or more of the total amount of all organic solvent components.

1.2.2. Surfactant

The nonaqueous ink composition of the embodiment may further contain a silicon surfactant, a fluorine surfactant, or a polyoxyethylene derivative, i.e., a nonionic surfactant, in addition to the organic solvents described above in order to lower the surface tension and improve the wettability to a recording medium.

The silicon surfactant is preferably polyester-modified silicon or polyether-modified silicon. Specific examples thereof include BYK-347 and 348, BYK-UV 3500, 3510, 3530, and 3570 (produced by BYK Japan KK).

The fluorine surfactant is preferably a fluorine-modified polymer. Specific examples thereof include BYK-340 (produced by BYK Japan KK).

The polyoxyethylene derivative is preferably an acetylene glycol surfactant. Specific examples thereof include Surfynol 82, 104, 465, 485, and TG (produced by Air Products Japan), OLFINE STG and E1010 (produced by Nissin Chemical Industry Co., Ltd.), Nissan Nonion A-10R and A-13R (produced by NOF Corporation), FLOWLEN TG-740W and D-90 (produced by Kyoeisha Chemical Co., Ltd.), and NOIGEN CX-100 (produced by Dai-Ichi Kogyo Seiyaku Co., Ltd.).

The surfactant content in the nonaqueous ink composition of this embodiment is preferably 0.05 to 3% by mass and more preferably 0.5 to 2% by mass.

1.2.3. Pigment and Dispersant

Pigments such as a colored inorganic pigment or a colored organic pigment usually used as a colorant for nonaqueous ink compositions can be used in the nonaqueous ink composition of this embodiment. These pigments may be used alone or in combination.

Examples of the pigment include azo pigments such as azo lakes, insoluble azo pigments, fused azo pigments, chelate azo pigments; polycyclic pigments such as phthalocyanine pigments, perylene and perylene pigments, anthraquinone pigments, quinacridone pigments, dioxazine pigments, thioindigo pigments, isoindolinone pigments, and quinophthalone pigments; dye lakes such as basic dye lakes and acidic dye lakes; organic pigments such as nitro pigments, nitroso pigments, aniline black, and daylight fluorescent pigments; and inorganic pigments such as carbon black. The average primary particle size of the pigment particles is not particularly limited but is preferably 50 to 500 nm.

Examples of the pigment used to prepare a magenta or red nonaqueous ink composition include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 194, C.I. Pigment Red 209, C.I. Pigment Red 222, and C.I. Pigment Red 224.

Examples of the pigment used to prepare an orange or yellow nonaqueous ink composition include C.I. Pigment Orange 31, C.I. Pigment Orange 43, C.I. Pigment Orange 64, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 150, and C.I. Pigment Yellow 180.

Examples of the pigment used to prepare a green or cyan nonaqueous ink composition include C.I. Pigment Blue 15, C.I. Pigment Blue 15:2, C.I. Pigment Blue 15:3, C.I. Pigment Blue 16, C.I. Pigment Blue 60, C.I. Pigment Green 7, and C.I. Pigment Green 36.

Examples of the pigment used to prepare a black nonaqueous ink composition include carbon black.

Examples of the pigment used to prepare a white nonaqueous ink composition include Pigment White 6, 18, and 21.

The pigment content in the nonaqueous ink composition of the embodiment can be adequately selected according to usage and printing properties. The pigment content is preferably 0.5 to 25% by mass, more preferably 0.5 to 15% by mass, and most preferably 1 to 10% by mass.

A dispersant used in common nonaqueous ink compositions may be used in the nonaqueous ink composition of the embodiment to improve the dispersion stability of the pigment. The dispersant is preferably a dispersant that acts effectively when the solubility parameter of the organic solvent is 8 to 11. Specific examples of such a dispersant include polyester high-molecular-weight compounds such as Hinoact KF1-M, T-6000, T-7000, T-8000, T-8350P, and T-8000E (produced by Takefu Fine Chemicals), Solsperse 20000, 24000, 32000, 32500, 33500, 34000, 35200, and 37500 (produced by The Lubrizol Corporation), Disperbyk-161, 162, 163, 164, 166, 180, 190, 191, and 192 (produced by BYK Japan KK), FLOWLEN DOPA-17, 22, 33, and G-700 (produced by Kyoeisha Chemical Co., Ltd.), Ajisper PB821 and PB711 (produced by Ajinomoto Inc.), and LP4010, LP4050, LP4055, and POLYMER 400, 401, 402, 403, 450, 451, and 453 (produced by EFKA Chemicals).

The dispersant content in the nonaqueous ink composition of this embodiment can be adequately selected according to the pigment to be dispersed. The dispersant content is preferably 5 to 200 parts by mass and more preferably 30 to 120 parts by mass relative to 100 parts by mass of the pigment in the nonaqueous ink composition.

1.2.4. Other Additives

The nonaqueous ink composition of the embodiment may further contain other additives usually contained in nonaqueous ink compositions. Examples of such additives include stabilizers such as antioxidants and UV absorbers, and binder resins.

Examples of the antioxidant include BHA (2,3-butyl-4-oxyanisole) and BHT (2,6-di-tert-butyl-p-cresol). The antioxidant content in the nonaqueous ink composition of the embodiment is preferably 0.01 to 3% by mass.

Examples of the UV absorber include benzophenone compounds and benzotriazole compounds. The UV absorber content in the nonaqueous ink composition of the embodiment is preferably 0.01 to 0.5% by mass.

The nonaqueous ink composition of the embodiment may contain a binder resin to adjust the viscosity of the ink. Examples of the binder resin include acrylic resins, styrene acrylic resins, rosin-modified resins, phenolic resins, terpene resins, polyester resins, polyamide resins, epoxy resins, vinyl chloride-vinyl acetate copolymer resins, fibrous resins such as cellulose acetate butyrate, and vinyl toluene-α-methyl styrene copolymer resins. These binder resins may be used alone or in combination. The binder resin can further enhance the fixability of the ink to the vinyl chloride resins if added in adequate amounts.

1.2.5. Method for Producing Nonaqueous Ink Composition

The nonaqueous ink composition of the embodiment can be made by a common method. When a pigment is to be used as a colorant, the pigment, a dispersant, and a portion of a diethylene glycol compound are first mixed and dispersed with a ball mill, a bead mill, or a jet mill or by ultrasonic waves so as to prepare a pigment dispersion and adjust the ink properties. Then the solvent represented by formula (1) above, the remaining portion of the diethylene glycol compound, and other additives (such as a surfactant and a binder resin) are added to the resulting mixture under stirring to obtain a nonaqueous ink composition.

1.2.6. Physical Properties

The nonaqueous ink composition of the embodiment preferably has a surface tension at 20° C. of 20 to 50 mN/m and more preferably 25 to 40 mN/m in view of the balance between the printing quality and the reliability of the inkjet ink composition. The surface tension is measured with an automatic surface tensiometer CBVP-Z (produced by Kyowa Interface Science Co., Ltd.) by determining the surface tension observed when a platinum plate is wetted with ink in a 20° C. environment.

From the same viewpoint, the viscosity of the nonaqueous ink composition of the embodiment at 20° C. is preferably 2 to 15 mPa·s, and more preferably 2 to 10 mPa·s. The viscosity is measured with a viscoelasticity tester MCR-300 (produced by Physica) in a 20° C. environment by elevating the shear rate from 10 to 1000 and reading the viscosity at a shear rate of 200.

2. Ink Jet Recording Method

An ink jet recording method according to an embodiment includes discharging droplets of the nonaqueous ink composition described above and recording an image by allowing the droplets to adhere to a surface of a recording medium containing a vinyl chloride resin. The nonaqueous ink composition contains a solvent represented by general formula (1) above and interacts with the vinyl chloride resin. Thus, the ink jet recording method of this embodiment has an advantage that the droplets of the nonaqueous ink composition forming the image can be firmly fixed on the recording medium.

The recording medium used in the ink jet recording method of this embodiment is not particularly limited as long as the recording medium contains a vinyl chloride resin. Examples of the recording medium that contains a vinyl chloride resin include hard or soft vinyl chloride films and sheets. The nonaqueous ink composition enables an image to be recorded onto an unprocessed surface of a vinyl chloride resin base and offers an advantage that expensive recording media, such as recording media having receiving layers, are no longer necessary. However, the nonaqueous ink composition can naturally be used on a surface-processed base such as a base having an ink-receiving layer.

The ink jet recording apparatus used in the ink jet recording method of the embodiment is not particularly limited but is preferably a drop-on-demand-type ink jet recording apparatus. There are different types of drop-on-demand-type ink jet recording apparatuses, including those that employ a piezoelectric recording method that uses piezoelectric elements disposed in a recording head and those that employ a thermal jet recording method that uses thermal energy from heaters of exothermic bodies disposed in a recording head. Any of the recording methods may be employed. Since the nonaqueous ink composition of the embodiment has an advantage that it is inactive to the discharge nozzle surfaces subjected to ink-repelling treatment, the nonaqueous ink composition can be advantageously used in the ink jet recording method that discharges ink through an ink jet recording head having a discharge nozzle surface subjected to ink-repelling treatment.

3. Examples

The invention will now be described by way of examples. These examples do not limit the scope of the invention.

3.1. Synthesis of Solvent 3.1.1. Solvent A

In a 300 ml separable flask equipped with a stirrer, a thermocouple, and a nitrogen gas inlet tube, 19.828 g of N,N-dimethylacrylamide and 6.408 g of methanol were placed. The mixture was stirred while introducing nitrogen gas. To the resulting mixture, 0.338 g of sodium tert-butoxide was added, and reaction was conducted at 35° C. for 4 hours. Upon completion of heating, 150 mg of phosphoric acid was added to homogenize the solution, and the solution was left standing for 3 hours. The solution was filtered to remove precipitates, and unreacted components were removed with an evaporator. As a result, a solvent A represented by formula (6) below was obtained:

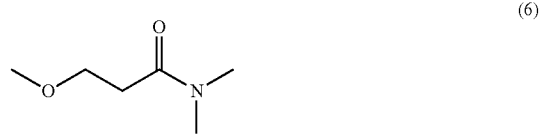

The HLB value of the solvent A calculated by equation (2) above from the I/O value in the organic conceptual diagram was 18.3.

3.1.2. Solvent B

In a 300 ml separable flask equipped with a stirrer, a thermocouple, and a nitrogen gas inlet tube, 19.828 g of N,N-dimethylacrylamide and 14.824 g of 1-butanol were placed. The mixture was stirred while introducing nitrogen gas. To the resulting mixture, 0.338 g of sodium tert-butoxide was added, and reaction was conducted at 35° C. for 4 hours. Upon completion of heating, 150 mg of phosphoric acid was added to homogenize the solution, and the solution was left standing for 3 hours. The solution was filtered to remove precipitates, and unreacted components were removed with an evaporator. As a result, a solvent B represented by formula (7) below was obtained.

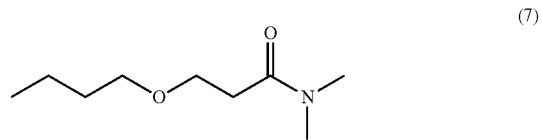

The HLB value of the solvent B calculated by equation (2) above from the I/O value in the organic conceptual diagram was 12.2.

3.2. Preparation of Nonaqueous Ink Composition

Solvents in amounts equivalent to the concentrations set forth in Tables 1 to 3 below were placed in a container for each ink, and the mixture was stirred with a magnetic stirrer for 30 minutes to obtain a mixed solvent.

A portion of the mixed solvent was separated, and particular amounts of Solsperse 37500 (trade name, produced by The Lubrizol Corporation) and C.I. Pigment Black 7 (trade name: CARBON BLACK produced by Mitsubishi Chemical Corporation) were added to the portion. The resulting mixture was pulverized with a homogenizer and dispersed with a bead mill containing zirconia beads having a diameter of 0.3 mm so as to obtain a pigment dispersion.

To the pigment dispersion, the rest of the mixed solvent and BYK-340 (fluorine surfactant produced by BYK Japan KK) were added, followed by stirring for 1 hour. The mixture was filtered through a PTFE membrane filter having a pore diameter of 5 μm. As a result, black ink compositions shown in Tables 1 to 3 were obtained. In the table, the unit of the figures is % by mass.

The materials set forth in the tables are as follows:

C.I. Pigment Black 7 (black pigment, trade name: CARBON BLACK produced by Mitsubishi Chemical Corporation)

Solsperse 37500 (trade name, dispersant produced by The Lubrizol Corporation)

γ-Butyrolactone (trade name, solvent produced by Kanto Chemical Co., Inc.)

N-Methylpyrrolidone (trade name, solvent produced by Kanto Chemical Co., Inc.)

2-Pyrrolidone (trade name, solvent produced by Kanto Chemical Co., Inc.)

Dimethyl sulfoxide (trade name, solvent produced by Kanto Chemical Co., Inc.)

Dimethyl succinate (trade name, solvent produced by Kanto Chemical Co., Inc.)

Diethyl succinate (trade name, solvent produced by Kanto Chemical Co., Inc.)

Dimethyl glutarate (trade name, solvent produced by Kanto Chemical Co., Inc.)

Tetraethylene glycol dimethyl ether (trade name, solvent produced by Nippon Nyukazai Co., Ltd.)

Triethylene glycol dimethyl ether (trade name, solvent produced by Nippon Nyukazai Co., Ltd.)

Diethylene glycol diethyl ether (trade name, solvent produced by Nippon Nyukazai Co., Ltd.)

Diethylene glycol butyl methyl ether (trade name: HISOLV BDM, solvent produced by Toho Chemical Industry Co., Ltd.)

BYK-340 (trade name, fluorine surfactant produced by BYK Japan KK)

3.3. Evaluation Tests 3.3.1. Rubbing Fastness Test

Each of the ink compositions obtained in "3.2. Preparation of nonaqueous ink composition" was printed on a glossy polyvinyl chloride sheet (SV-G-1270G produced by Roland DG Corporation) at 100% duty by using a printer, SP-300V produced by Roland DG Corporation and dried at normal temperature for 1 day. As a result, an evaluation sample was obtained.

Next, the evaluation sample was subjected to a dry test using a I-type tester according to Japanese Industrial Standard (JIS) L 0849. Then the optical density (OD) value of the evaluation sample was measured with Spectrolino (produced by GretagMacbeth). The evaluation standard is shown below and the evaluation results are shown in Tables 1 to 3.

7: OD<0.15
6: 0.15≤OD<0.20
5: 0.20≤OD<0.25
4: 0.25≤OD<0.30
3: 0.30≤OD<0.35
2: 0.35≤OD<0.40
1: 0.40≤OD 3.3.2. Surface Drying Property Test Each of the ink compositions obtained in "3.2. Preparation of nonaqueous ink composition" was printed on a glossy polyvinyl chloride sheet (SV-G-1270G produced by Roland DG Corporation at 100% duty by using a printer, SP-300V produced by Roland DG Corporation) and dried for 5 minutes. The glossy polyvinyl chloride sheet was wound using a winder and the winding marks that remain on the glossy surface were observed. The percentage of the area where winding marks were found was determined by observing the surface roughness of the glossy surface with a 3D laser scanning microscope VK-8700 Generation II (produced by Keyence Corporation). The evaluation standard is as follows. The results of evaluation are shown in Tables 1 to 3.

5: The winding mark area percentage was less than 10%.
4: The winding mark area percentage was 10% or more but less than 20%.
3: The winding mark area percentage was 20% or more but less than 30%.
2: The winding mark area percentage was 30% or more but less than 40%.
1: The winding mark area percentage was 40% or more.

3.3.3. Discharge Amount Test

Each of the ink compositions obtained in "3.2. Preparation of nonaqueous ink composition" was discharged from an ink jet recording head of a printer, SP-300V produced by Roland DG Corporation, and the amount of the ink composition discharged was measured. The discharge amount was determined by a subtraction method by which the decrease from the amount of the ink composition supplied to the ink jet recording head was determined. The evaluation results shown in Tables 1 to 3 are results calculated by the subtraction method in a 25° C. temperature/40% humidity environment by using a standard driving voltage and a waveform capable of discharging 7 ng of the ink composition of Example 3 at a frequency of 14.4 kHz.

In fixing a colorant on a surface of a recording medium by using a pigment as the colorant, coloring (OD value) tends to be high when large droplets are used to record an image than when a larger number of small droplets are used to record an image, provided that the amount of the ink composition used is the same. In other words, it is advantageous from the standpoint of enhancing the color development property to achieve a larger ink discharge amount.

3.3.4. High-Frequency Compatibility Test

The head driving frequency of a printer, SP-300V produced by Roland DG Corporation was varied and the path of the discharged ink droplets at various frequencies was investigated. In particular, the shape of the droplets, whether the path of the discharged ink droplets is free of deflection, and whether the observed properties are ensured during continuous discharge (continuous discharge stability) were evaluated. The maximum frequency that satisfied all of the evaluation items was determined. Evaluation results are shown in Tables 1 to 3.

TABLE 1

| | Materials | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Pigment | C.I. Pigment Black 7 | 4.00 | 4.00 | 4.00 | 4.00 | 4.00 | 4.00 | 4.00 | 4.00 | 4.00 |
| Dispersant | Solsperse 37500 | 4.00 | 4.00 | 4.00 | 4.00 | 4.00 | 4.00 | 4.00 | 4.00 | 4.00 |
| Solvent | Solvent A | 10.00 | | | | | | | | |
| | Solvent B | | 10.00 | | | | | | | |
| | γ-Butyrolactone | | | 10.00 | | | | | | |
| | N-Methylpyrrolidone | | | | 10.00 | | | | | |
| | 2-Pyrrolidone | | | | | 10.00 | | | | |
| | Dimethylsulfoxide | | | | | | 10.00 | | | |
| | Dimethyl succinate | | | | | | | 10.00 | | |
| | Diethyl succinate | | | | | | | | | 10.00 |

TABLE 1-continued

| | Materials | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| | Dimethyl glutarate | | | | | | | | | 10.00 |
| | Tetraethylene glycol dimethyl ether | | | | | | | | | |
| | Triethylene glycol dimethyl ether | | | | | | | | | |
| | Diethylene glycol diethyl ether | 50.00 | 50.00 | 50.00 | 50.00 | 50.00 | 50.00 | 50.00 | 50.00 | 50.00 |
| | Diethylene glycol butyl methyl ether | 30.00 | 30.00 | 30.00 | 30.00 | 30.00 | 30.00 | 30.00 | 30.00 | 30.00 |
| Surfactant | BYK 340 | 2.00 | 2.00 | 2.00 | 2.00 | 2.00 | 2.00 | 2.00 | 2.00 | 2.00 |
| Total | | 100.00 | 100.00 | 100.00 | 100.00 | 100.00 | 100.00 | 100.00 | 100.00 | 100.00 |
| Rubbing fastness | | 6 | 6 | 4 | 4 | 2 | 2 | 4 | 4 | 4 |
| Surface drying property | | 5 | 5 | 4 | 4 | 3 | 4 | 4 | 4 | 4 |
| Discharge amount (ng) | | 8 | 8 | 7 | 7 | 7 | 7 | 7 | 7 | 7 |
| High-frequency compatibility test (kHz) | | 45 | 45 | 35 | 35 | 35 | 35 | 35 | 35 | 35 |

TABLE 2

| | Materials | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Pigment | C.I. Pigment Black 7 | 4.00 | 4.00 | 4.00 | 4.00 | 4.00 | 4.00 | 4.00 | 4.00 | 4.00 |
| Dispersant | Solsperse 37500 | 4.00 | 4.00 | 4.00 | 4.00 | 4.00 | 4.00 | 4.00 | 4.00 | 4.00 |
| Solvent | Solvent A | | | 30.00 | | | | | | |
| | Solvent B | | | | 30.00 | | | | | |
| | γ-Butyrolactone | | | | | 30.00 | | | | |
| | N-Methylpyrrolidone | | | | | | 30.00 | | | |
| | 2-Pyrrolidone | | | | | | | 30.00 | | |
| | Dimethylsulfoxide | | | | | | | | 30.00 | |
| | Dimethyl succinate | | | | | | | | | 30.00 |
| | Diethyl succinate | | | | | | | | | |
| | Dimethyl glutarate | | | | | | | | | |
| | Tetraethylene glycol dimethyl ether | 10.00 | | | | | | | | |
| | Triethylene glycol dimethyl ether | | 10.00 | | | | | | | |
| | Diethylene glycol diethyl ether | 50.00 | 50.00 | 30.00 | 30.00 | 30.00 | 30.00 | 30.00 | 30.00 | 30.00 |
| | Diethylene glycol butyl methyl ether | 30.00 | 30.00 | 30.00 | 30.00 | 30.00 | 30.00 | 30.00 | 30.00 | 30.00 |
| Surfactant | BYK 340 | 2.00 | 2.00 | 2.00 | 2.00 | 2.00 | 2.00 | 2.00 | 2.00 | 2.00 |
| Total | | 100.00 | 100.00 | 100.00 | 100.00 | 100.00 | 100.00 | 100.00 | 100.00 | 100.00 |
| Rubbing fastness | | 4 | 2 | 7 | 7 | 5 | 5 | 2 | 2 | 6 |
| Surface drying property | | 3 | 3 | 5 | 5 | 3 | 3 | 2 | 3 | 3 |
| Discharge amount (ng) | | 7 | 7 | 9 | 9 | 7 | 7 | 7 | 7 | 7 |
| High-frequency compatibility test (kHz) | | 35 | 35 | 50 | 50 | 35 | 35 | 35 | 35 | 35 |

TABLE 3

| | Materials | Ex. 19 | Ex. 20 | Ex. 21 | Ex. 22 | Ex. 23 | Ex. 24 |
|---|---|---|---|---|---|---|---|
| Pigment | C.I. Pigment Black 7 | 4.00 | 4.00 | 4.00 | 4.00 | | |
| Dispersant | Solsperse 37500 | 4.00 | 4.00 | 4.00 | 4.00 | | |
| Solvent | Solvent A | | | | | 38.00 | |
| | Solvent B | | | | | | 38.00 |
| | γ-Butyrolactone | | | | | | |
| | N-Methylpyrrolidone | | | | | | |
| | 2-Pyrrolidone | | | | | | |
| | Dimethylsulfoxide | | | | | | |
| | Dimethyl succinate | | | | | | |
| | Diethyl succinate | 30.00 | | | | | |
| | Dimethyl glutarate | | 30.00 | | | | |
| | Tetraethylene glycol dimethyl ether | | | 30.00 | | | |
| | Triethylene glycol dimethyl ether | | | | 30.00 | | |
| | Diethylene glycol diethyl ether | 30.00 | 30.00 | 30.00 | 30.00 | 30.00 | 30.00 |
| | Diethylene glycol butyl methyl ether | 30.00 | 30.00 | 30.00 | 30.00 | 30.00 | 30.00 |
| Surfactant | BYK 340 | 2.00 | 2.00 | 2.00 | 2.00 | 2.00 | 2.00 |
| Total | | 100.00 | 100.00 | 100.00 | 100.00 | 100.00 | 100.00 |
| Rubbing fastness | | 6 | 6 | 5 | 2 | — | — |
| Surface drying property | | 3 | 3 | 2 | 3 | 5 | 5 |
| Discharge amount (ng) | | 7 | 7 | 7 | 7 | 9 | 9 |
| High-frequency compatibility test (kHz) | | 35 | 35 | 35 | 35 | 50 | 50 |

3.3.5. Evaluation Results

In Examples 1 and 2, an adequate degree of pseudoplasticity was imparted to the ink due to the incorporation of Solvent A or B. Thus, results of the tests for the discharge amount and high-frequency compatibility were satisfactory, indicating high discharge stability. Since results of the tests for the rubbing fastness were also satisfactory, it has been shown that the ink can firmly adhere to the glossy polyvinyl chloride sheet and thus exhibits improved rubbing fastness. The surface drying property of the ink was also enhanced.

In Examples 3 to 11 in which inks that contain solvents other than Solvents A and B were used, the results of the evaluation test for high-frequency compatibility were significantly poor and the results of the evaluation test for rubbing fastness were also significantly poor compared to Examples 1 and 2.

The results of Examples 12 and 22 were similar to those of Examples 1 to 11.

In Examples 23 and 24, since an adequate degree of pseudoplasticity was imparted to the ink by incorporation of Solvent A or B without using a pigment, good results were obtained from the evaluation tests for the discharge amount and high-frequency compatibility, which shows that the discharge stability will also be good. These results suggest that the material that contributes to discharge stability is either Solvent A or Solvent B. The surface drying property of the ink was also good.

The scope of the invention is not limited by the aforementioned embodiments and various modifications are possible. For example, the invention encompasses structures substantially identical to those described in the embodiments (e.g., structures that offer the same functions, methods, and results and structures that have the same objects and effects). The invention also encompasses the structures of the embodiments from which non-essential portions are replaced and structures that achieve the same advantageous effects or object. The invention further encompasses structures of the embodiments to which known technology is added.

What is claimed is:

1. A nonaqueous ink composition for ink jet recording, comprising:
    a pigment, present in an amount of 0.5 to 25% by mass;
    a solvent represented by general formula (6)

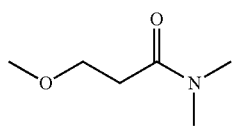

(6)

wherein a content of the solvent represented by general formula (6) is 30 to 90% by mass;
    a surfactant comprising at least one selected from a silicon surfactant, a fluorine surfactant, a polyoxyethylene derivative, and a nonionic surfactant, present in an amount of 0.05 to 3% by mass; and
    an ethylene glycol compound present in an amount of 20 to 80% by mass;
    wherein a surface tension at a measuring temperature is 20° C. is 20 mN/m to 50 mN/m.

2. The nonaqueous ink composition according to claim 1, further comprising:
    at least one selected from the group consisting of an alkylene glycol compound and a lactone that are liquid under normal temperature and pressure.

3. The nonaqueous ink composition according to claim 1, wherein a viscosity at a measuring temperature of 20° C. is 2 mPa·s to 15 mPa·s.

4. An ink jet recording method comprising:
    discharging droplets of the nonaqueous ink composition according to claim 1; and
    allowing the droplets to adhere to a surface of a recording medium containing a vinyl chloride resin so as to record an image.

5. An ink jet recording method comprising:
    discharging droplets of the nonaqueous ink composition according to claim 2; and
    allowing the droplets to adhere to a surface of a recording medium containing a vinyl chloride resin so as to record an image.

6. An ink jet recording method comprising:
    discharging droplets of the nonaqueous ink composition according to claim 3; and
    allowing the droplets to adhere to a surface of a recording medium containing a vinyl chloride resin so as to record an image.

* * * * *